United States Patent [19]

Guy

[11] Patent Number: 5,893,436
[45] Date of Patent: Apr. 13, 1999

[54] ONE PIECE ALUMINUM PRESSURE TUBE WITH ROD GUIDE FOR SHOCK ABSORBERS

[75] Inventor: Yoram Guy, Ann Arbor, Mich.

[73] Assignee: Tenneco Automotive Inc., Lake Forest, Ill.

[21] Appl. No.: 08/587,416

[22] Filed: Jan. 16, 1996

[51] Int. Cl.⁶ ............................................ F16F 9/34
[52] U.S. Cl. ............................ 188/322.15; 188/322.14
[58] Field of Search ................. 188/322.15, 322.14, 188/322.16, 322.17, 322.13, 322.18, 322.19, 322.11, 322.22, 313–318, 311; 267/64.15, 64.26, 120, 124; 92/174, 181 P

[56] References Cited

U.S. PATENT DOCUMENTS

| | | |
|---|---|---|
| 4,405,119 | 9/1983 | Maslet ........................ 267/64.22 |
| 4,508,201 | 4/1985 | Axthammer et al. . |
| 4,585,099 | 4/1986 | Taylor ........................ 188/322.19 |
| 4,633,983 | 1/1987 | Horvath et al. . |
| 4,738,339 | 4/1988 | Taylor ........................ 188/322.19 |
| 5,392,885 | 2/1995 | Patzenhauer et al. ............ 188/299 |
| 5,400,877 | 3/1995 | Kircher ...................... 188/322.14 |
| 5,423,402 | 6/1995 | de Kock ..................... 188/322.14 |
| 5,464,079 | 11/1995 | Lohberg ..................... 188/322.14 |

*Primary Examiner*—Matthew C. Graham
*Assistant Examiner*—C. T. Bartz
*Attorney, Agent, or Firm*—Harness, Dickey & Pierce, PLC

[57] ABSTRACT

A shock absorber includes an integral pressure tube and rod guide. The integration of these two components manufactured from aluminum allows the use of an aluminum pressure tube to eliminate axial differential thermal expansion between the pressure tube and an aluminum reserve tube. The use of aluminum for these two components reduces weight and improves the heat dissipation for the shock absorber. On addition, by producing the rod guide integral with the pressure tube and also of aluminum, additional weight savings are realized. Further advantages for the integration of these components include the elimination of leak paths, the limitation of assembly operations and the opportunity to utilize a "near net-shape" manufacturing process such as impact extrusion or semi-solid forming for the manufacture of the integral pressure tube and rod guide.

6 Claims, 2 Drawing Sheets

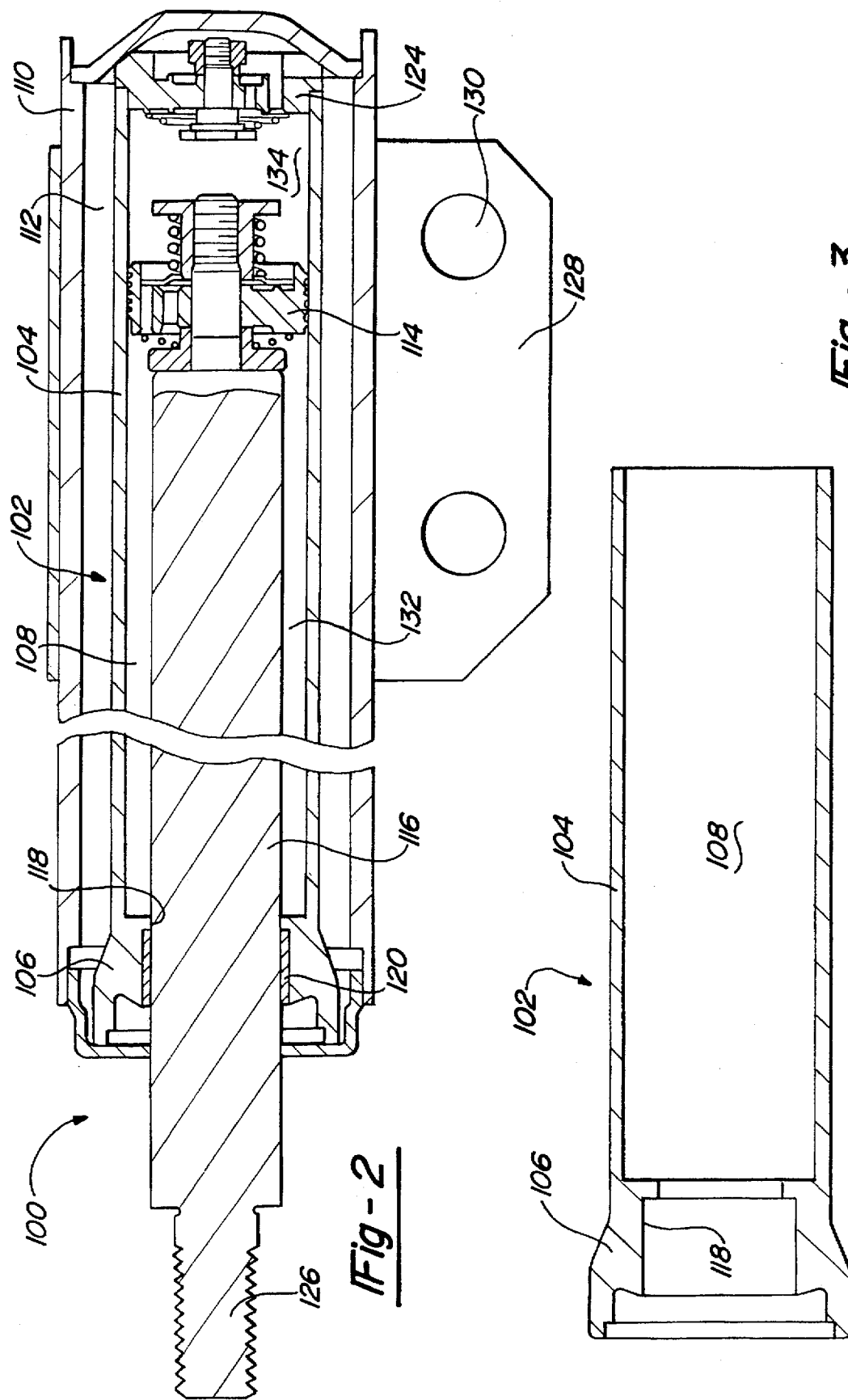

ONE PIECE ALUMINUM PRESSURE TUBE WITH ROD GUIDE FOR SHOCK ABSORBERS

FIELD OF THE INVENTION

The present invention relates generally to suspension systems for motor vehicles and machines which receive mechanical shock. More particularly, the present invention relates to a one-piece aluminum pressure tube and rod guide in a telescopic damper ("shock absorber") or strut with an aluminum body which eliminates axial differential thermal expansion between the pressure tube and the aluminum body.

BACKGROUND OF THE INVENTION

Hydraulic dampers, such as shock absorbers, are used in connection with motor vehicle suspension systems to absorb unwanted vibrations which occur during the operation of the motor vehicle. The unwanted vibrations are dampened by shock absorbers which are generally connected between the sprung portion (i.e. the vehicle body) and the unsprung portion (i.e. the suspension) of the motor vehicle. A piston assembly is located within the compression chamber of the shock absorber and is usually connected to the body of the motor vehicle through a piston rod. The piston assembly includes a valving arrangement that is able to limit the flow of damping fluid within the compression chamber when the shock absorber is compressed or extended. As such, the shock absorber is able to generate a damping force which "smooths" or "dampens" the vibrations transmitted between the suspension and the vehicle body.

A conventional prior art twin tube shock absorber 10 is shown in FIG. 1 and comprises a piston rod assembly 12, a pressure tube assembly 14, and a reserve tube 16. Piston rod assembly 12 is disposed within pressure tube assembly 14 and includes a piston rod 18 having an adaptor 20 at one end which extends out of pressure tube assembly 14 for connection to the motor vehicle. The opposite end of piston rod 18 is attached to a piston valve 22 which is slidably received within pressure tube assembly 14. Pressure tube assembly 14 comprises a pressure tube 24 having a rod guide 26 located at one end and a base valve 28 located at the opposite end. Rod guide 26 slidingly receives piston rod 18 and usually includes a rod bearing 30 disposed between rod guide 26 and piston rod 18 for sealingly engaging piston rod 18. Base valve 28 controls the flow of fluid between a compression chamber 31 defined by pressure tube 24 and a reservoir 32 defined by reserve tube 16. Reservoir 32 coaxially surrounds pressure tube 24 and extends between base valve 28 and rod guide 26. Reserve tube 16 includes a fitting 34 which facilitates the connection of tube 16 to the motor vehicle.

Damping characteristics for shock absorber 10 are controlled by orifices in piston valve 22 and base valve 28 which regulate passage of fluid from one side of piston valve 22 to the other and from compression chamber 31 to reservoir 32. Due to the presence of piston rod 18 on only one side of piston valve 22, the volume of hydraulic fluid which must be displaced on the compression stroke is different from the volume of hydraulic fluid which must be displaced on the rebound stroke. This difference in volume is called the rod volume and it is compensated for by base valve 28 and reservoir 32. The rod volume of hydraulic fluid is throttled out of compression chamber 31 during the compression stroke through base valve 28 into reservoir 32. During the rebound strokes the rod volume of hydraulic fluid enters compression chamber 31 through base valve 28.

The continued movement of piston rod 18 and piston valve 22 back and forth within pressure tube 24 causes the rod volume of oil to be correspondingly throttled into and out of reservoir 32 through base valve 28. Thus, only a portion of the hydraulic fluid in reservoir 32 is effectively utilized. The remainder of hydraulic fluid within reservoir 32 remains relatively static. This quick exchange of hydraulic fluid through base valve 28 and piston valve 22 as well as the friction between piston valve 22 and pressure tube 24 and the friction between piston rod 18 and rod guide 26 generates heat which is undesirable during prolonged operating conditions.

In addition to absorbing the heat generated while providing the damping function for the motor vehicle, shock absorber 10 is also required to operate over a broad range of temperatures ranging from severe cold temperatures of the winter months to the extremely hot temperatures of the summer months. Prior art shock absorbers are manufactured using steel for pressure tube 24 and reserve tube 16. While steel has proven to be an acceptable material for these components, tubes manufactured from aluminum offer the advantages of weight savings as well as improved heat dissipation. If the typical pressure tube 24 were manufactured from steel while reservoir tube 16 were manufactured from aluminum, the difference in their relative axial thermal expansion rates may present problems for the shock absorber when operating over the necessary temperature extremes. Specifically, structural failure may occur under extreme cold temperatures or loss of pressure tube preload and sealing may occur under extreme hot temperatures. Similar problems may occur if pressure tube 24 were manufactured from aluminum and rod guide 26 were manufactured from steel.

Accordingly continued development of shock absorbers with aluminum tubes include the development of methods and components which can eliminate the problems associated with the differing thermal expansion between two different materials.

SUMMARY OF THE INVENTION

The present invention provides the art with as shock absorber which incorporates an integral or single piece pressure tube and rod guide. By integrating these two components into a single piece, the problems associated with differing thermal expansion between two different materials are eliminated.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention:

FIG. 2 is a longitudinal cross-sectional view through an aluminum bodied shock absorber incorporating the unique single piece pressure tube and rod guide in accordance with the present invention; and FIG. 3 is a longitudinal cross-sectional view through the integral pressure tube and rod guide shown in FIG. 2.

DETAILED DESCRIPTION OF THE PREFERRED EMBODIMENT

Figure 1:
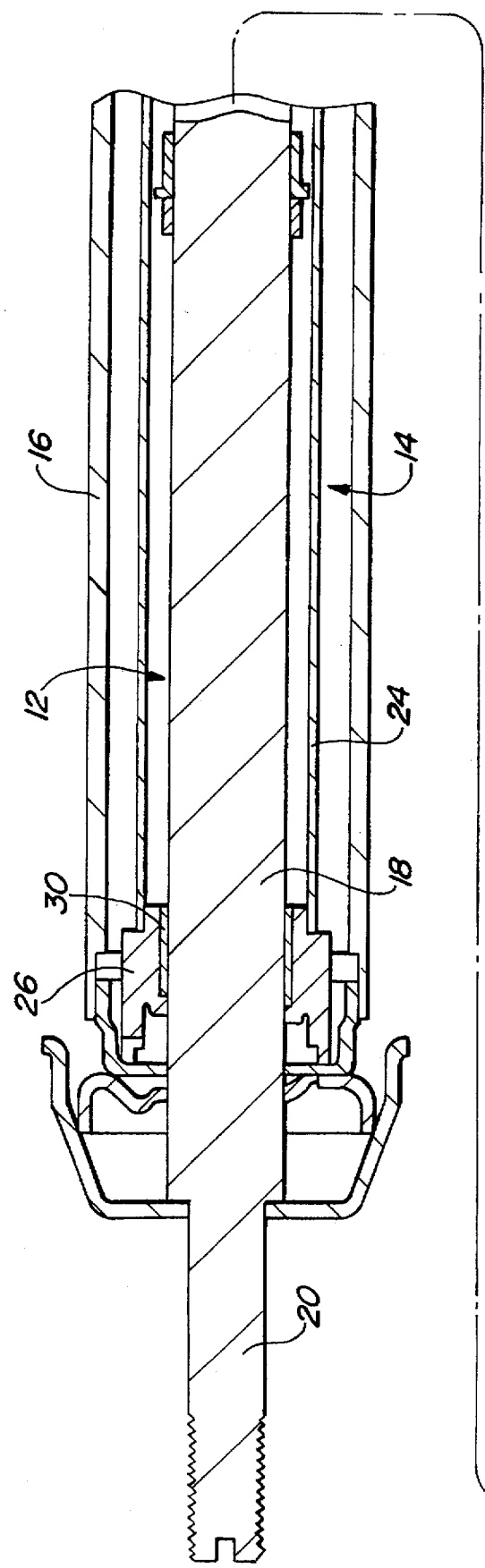
FIG. 1 is a longitudinal cross-sectional view through an all steel prior art shock absorber.
Figure 1:
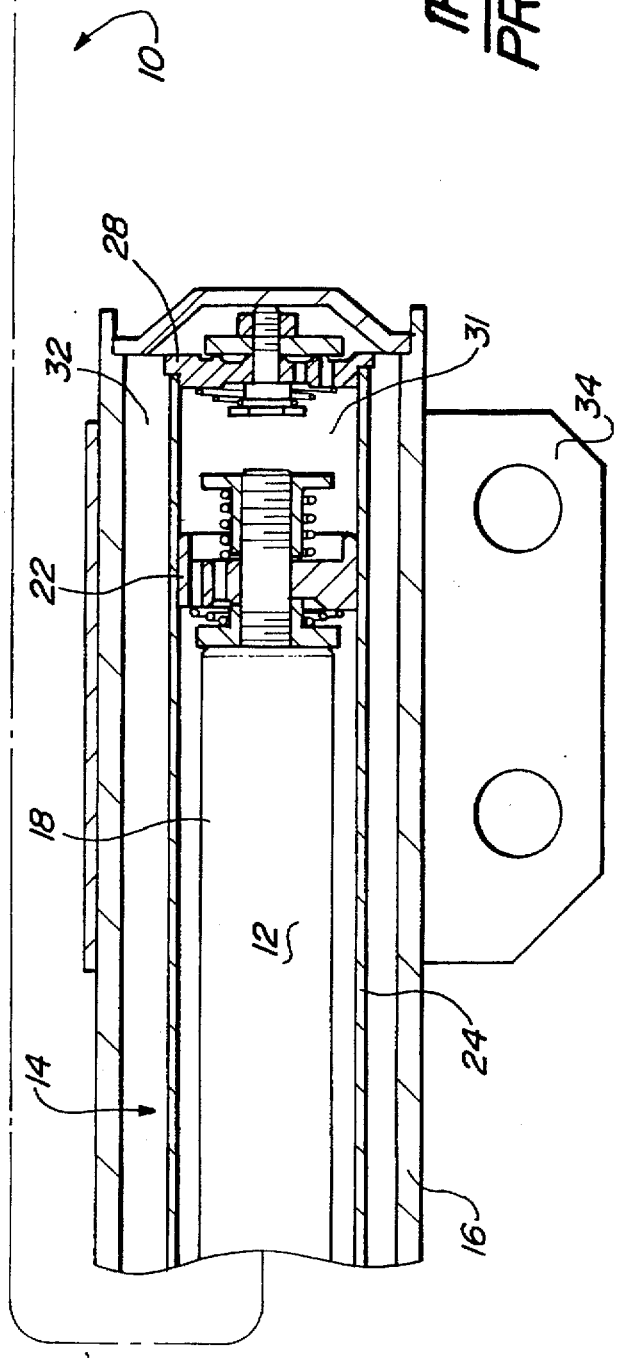

Referring now to the drawings in which like reference numerals designate like or corresponding parts throughout the several views, there is shown in FIGS. 2 and 3 a shock absorber incorporating an aluminum body and a unique single piece or integral pressure tube and rod guide in accordance with the present invention which is designated generally using the reference numeral 100. Shock absorber 100 comprises an aluminum elongated single piece or integral tubular pressure body 102 which defines a pressure tube 104 and a rod guide 106. Pressure tube 104 is provided for defining a hydraulic fluid containing compression chamber 108. Shock absorber 100 further comprises an elongated tubular body or reserve tube 110 provided for defining a hydraulic fluid containing reservoir 112. It is to be understood that the construction of shock absorber 100 is merely exemplary in nature and is only intended to illustrate one type of damping apparatus within which the unique integral pressure cylinder and piston bushing of the present invention can be utilized.

Disposed within compression chamber 108 is a reciprocal piston assembly 114 that is secured to one end of an axially extending piston rod 116. Piston rod 116 is supported and guided for movement within pressure tube 104 by means of rod guide 106 which defines a centrally extending bore 118 through which piston rod 116 is reciprocally movable. Disposed within bore 118 between rod guide 106 and piston rod 116 usually is a bearing 120 which is used to facilitate movement of piston rod 116 with respect to rod guide 106. Bearing 120 is usually insertable or welded into rod guide 106 from the outside of pressure tube 104 to simplify the assembly of bearing 120 and rod guide 106 of integral tubular pressure body 102. A seal assembly (not shown) provides for isolation of compression chamber 108 from the outside environment.

A bass valve assembly 124 is located at the lower end of pressure tube 104 and functions to control the flow of hydraulic fluid between compression chamber 108 and fluid reservoir 112. Fluid reservoir 112 is defined as the space between the outer peripheral surface of pressure tube 104 and the inner peripheral surface of reserve tube 110.

The upper and lower ends of shock absorber 100 are adapted for assembly into a motor vehicle or the like. Piston rod 116 is shown having a threaded portion 126 for securing the upper end of shock absorber 100 to the motor vehicle while reserve tube 110 is shown incorporating a flange 128 having a pair of mounting holes 130 for securing the lower and of shock absorber 100 to the motor vehicle (McPherson strut configuration). While shock absorber 100 is shown in a McPherson strut configuration having threaded portion 126 and flange 128 for securing it between the sprung and unsprung portions of the motor vehicle, it is to be understood that this is merely exemplary in nature and is only intended to illustrate one type of system for securing shock absorber 100 to the motor vehicle. As will be appreciated by those skilled in the art, upon reciprocal movement of piston rod 116 and piston assembly 114, hydraulic fluid within compression chamber 108 will be transferred between an upper portion 132 and a lower portion 134 of compression chamber 108 as well as between compression chamber 108 and fluid reservoir 112 through base valve 124 for damping relative movement between the sprung portion and the unsprung portion of the motor vehicle.

The present invention is directed to the unique single piece or integral tubular pressure body 102 which combines the separate pressure tube assembly 14 and rod guide 26 of the prior art into a single component. Tubular pressure body 102 is a single piece component made preferably out of aluminum to define pressure tube 104 and rod guide 106. The combining of these two components into an integral single component manufactured from aluminum allows the use of aluminum pressure tube 104 to eliminate axial differential thermal expansion between pressure tube 104 and aluminum reserve tube 110. The use of aluminum for these two components reduces weight and improves the heat dissipation for shock absorber 100. In addition, by making aluminum rod guide 106 integral with pressure tube 104, additional weight savings are realized. Further advantages for the integration of these components include the elimination of leak paths, the limitation of assembly operations and the opportunity to utilize a "near net-shape" manufacturing process such as impact extrusion or semi-solid forming for the manufacture of integral tubular pressure body 102.

While the above detailed description describes the preferred embodiment as being incorporated into a shock absorber having a pressure tube and a reserve tube, it is to be understood that the above integral tubular pressure body could be incorporated into a monotube shock absorber if desired.

While the above detailed description describes the preferred embodiment of the present invention, it should be understood that the present invention is susceptible to modification, variation and alteration without deviating from the scope and fair meaning of the subjoined claims.

What is claimed is:

1. A shock absorber comprising:
   a single piece aluminum alloy pressure body defining a rod guide, a pressure tube and a compression chamber;.
   a piston slidably disposed within said compression chamber;
   a piston rod connected to said piston, said piston rod being slidingly received by said rod guide;
   a reserve tube disposed around said pressure tube, said reserve tube and said pressure tube defining a fluid reservoir;
   a first valve member associated with said piston for controlling the flow of fluid within said compression chamber; and
   a second valve member disposed between said fluid reservoir and said compression chamber for controlling the flow of fluid between said fluid reservoir and said compression chamber.

2. The shock absorber according to claim 1 further comprising a bearing disposed between said rod guide and said piston rod.

3. A shock absorber comprising:
   an aluminum alloy pressure tube forming a compression chamber;
   an aluminum alloy rod guide integral with said pressure tube;
   a piston slidably disposed within said compression chamber;
   a piston rod connected to said piston, said piston rod being slidingly received by said rod guide;
   a reserve tube disposed around said pressure tube, said reserve tube and said pressure tube defining a fluid reservoir;

a first valve member associated with said piston for controlling the flow of fluid within said compression chamber; and a second valve member disposed between said reservoir and said compression chamber for controlling the flow of fluid between said reservoir and said compression chamber.

4. The shock absorber according to claim 3 further comprising a bearing disposed between said rod guide and said piston rod.

5. A shock absorber comprising:

a homogeneous cup shape aluminum alloy pressure tube having an open end and a closed end, said closed end of said pressure tube defining a piston rod bore, said pressure tube forming a compression chamber;

a piston slidably disposed within said compression chamber;

a piston rod connected to said piston, said piston rod being slidingly received within said piston rod bore of said pressure tube;

a reserve tube disposed around said pressure tube, said reserve tube and said pressure tube defining a fluid reservoir;

a first valve member associated with said piston for controlling the flow of fluid within said compression chamber; and a second valve member disposed between said reservoir and said compression chamber for controlling the flow of fluid between said reservoir and said compression chamber.

6. The shock absorber according to claim 5 further comprising a bearing disposed between said pressure tube and said piston rod.

* * * * *